Aug. 29, 1950        N. B. WALES        2,520,788
AUTOMATIC COOKING DEVICE

Filed Nov. 27, 1946        2 Sheets-Sheet 1

INVENTOR.
Nathaniel B. Wales

Aug. 29, 1950    N. B. WALES    2,520,788
AUTOMATIC COOKING DEVICE

Filed Nov. 27, 1946    2 Sheets-Sheet 2

INVENTOR
Nathaniel B. Wales

Patented Aug. 29, 1950

2,520,788

UNITED STATES PATENT OFFICE 2,520,788

AUTOMATIC COOKING DEVICE

Nathaniel B. Wales, New York, N. Y., assignor to Industrial Patent Corporation, New York, N. Y.

Application November 27, 1946, Serial No. 712,681

6 Claims. (Cl. 219—43)

This invention relates to an automatic cooking device and more particularly to a device which coordinates with a percolating or other type of coffee pot in the brewing of coffee.

An object of the device is to assure a safety factor wherein, if the empty pot is placed on the device, the electric heating element will not be energized, but if a predetermined minimum weight of water and coffee is in the pot, the electric heater is energized for a predetermined interval for the brewing thereof; the heater then shuts off and during a continuing interval the liquid in the pot is kept at a desired temperature by the intermittent energization of the electric heating element.

Moreover, if it is desired to make four cups of coffee rather than two cups the device will automatically compensate itself to prolong the coffee brewing period to allow the additional volume of water to be elevated to an infusion temperature, and likewise will compensate itself to keep the additional volume of coffee heated at a desired standby temperature.

More particularly the pot or utensil sustaining platform of the device, which as shown includes the electric heater, is virtually a weighing scale which is spring biased, so that, if the coffee pot or other form of cooking utensil is empty its weight will not depress the fulcrumed supporting platform sufficiently to close an electric switch controlling the heater. However, if a predetermined minimum of cooking liquid or substance is in the pot or utensil the platform is depressed sufficiently thereby to close the switch and energize the heater by the unsupported weight component of the pot or utensil over and above the biasing action of the spring attached thereto.

A thermostatic element shown here in the form of a bi-metallic bar is coincidently heated by the main heating element during the brewing or cooking interval, and by a manual adjustment of the thermostatic element the duration of this brewing interval may be selectively determined due to the bi-metallic element's distortion from the heat radiated from the heater. The consequent contact of the bi-metallic element with the underside of the cooking platform supplements the upward bias action of the spring to elevate the platform and terminate the pressure caused by the unbalanced increment of the pot or utensil in maintaining the switch in its energizing position.

A further object is to devise instrumentation so that the unbalanced weight component of the pot or utensil will be relatively small, in order that an inexpensive bi-metallic element may be employed to actuate the platform.

It is to be noted that an actual deflection of the bi-metallic element occurs, due to its contact with and the resistance thereto, of the unbalanced load of the platform, when the element contacts it. This deflection is utilized to give the added time interval required to heat a greater weight of water when brewing six cups of coffee as compared with two or three cups.

A further object is to devise a low cost automatic device composed of the fewest possible components.

Further objects will be more specifically illustrated and described in the following specifications and drawings, in which.

Figure 1:
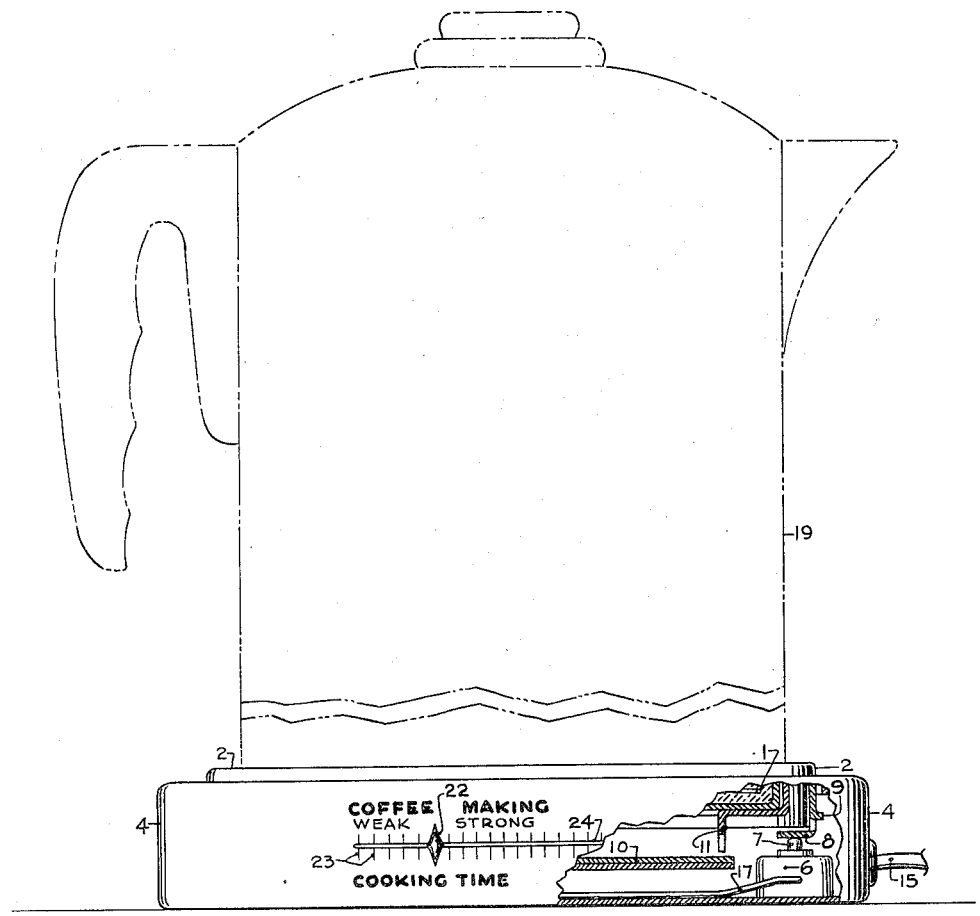
Figure 1 is a front elevation of the device, in which a portion of the case is broken away to show the switch for the electric heater in energized position due to the normal operating weight of a coffee pot placed thereon.
Figure 2:
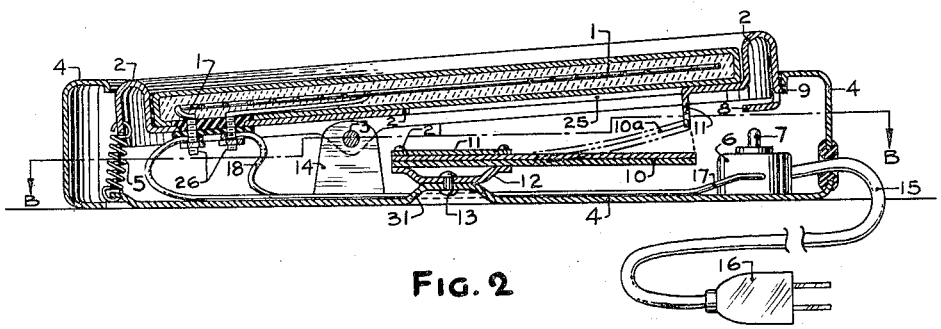
Figure 2 is a sectional elevation taken on line A—A in Figure 5 showing the device with its operative components in a position prior to the placement of a pot or cooking utensil thereon.
Figure 5:
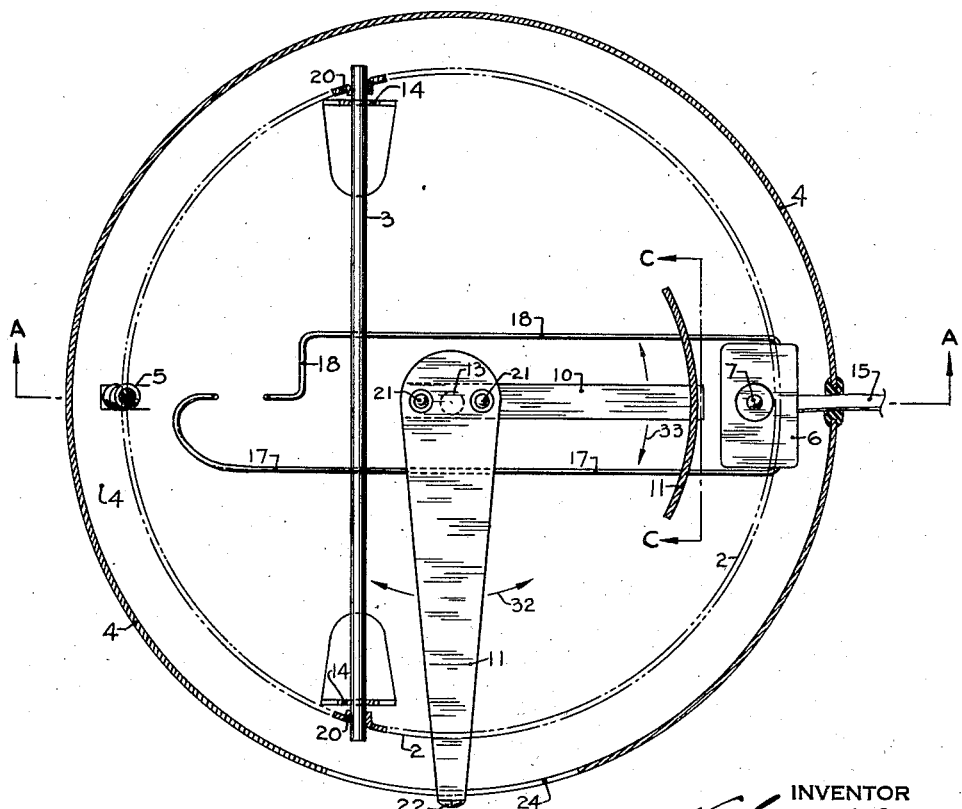
Figure 5 is a view in plan taken on line B—B in Figure 2 showing the pivoted structure of the pot supporting platform and means for a selective cooking time.

Referring to the drawings, similar numerals refer to similar parts. In Figure 1 numeral 1 indicates the electric heating element, supported in the recessed platform 2, which is sustained by pivot rod 3 supported in bearings 20, see Figure 5, together with the upturned pedestals 14 formed from the bottom of case 4, which surrounds platform 2 and permits the heater 1 and platform 2 to rock therein on pivot rod 3 as is seen in the two limiting positions thereof, viz. Figures 1 and 2. It is to be noted that the pivot 3 is positioned slightly off set from the geometric center of platform 2 so that only a fraction of the total weight of a utensil becomes an unbalanced component which the bi-metallic element 10 has to neutralize as will be more specifically described.

Figure 3:
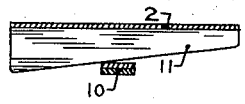
Figure 3 is a view in elevation taken on line C—C in Figure 5 of the cam-formed contact and showing the bi-metallic thermostatic element contacting therewith.

The spring 5 suitably secured on its respective ends to platform 2 and the bottom of case 4 normally biases the pivoted platform 2 into the position as is seen in Figure 2. Electric switch 6 secured to the case 4 has an operative contact 7 against which the contact arm 8 registers when a pot or utensil with predetermined weight is placed on platform 2, see Figure 1, and depresses contact member 7 to close switch 6. A projecting lug 9, see Figure 1, limits the tilted position of platform 2 under bias of spring 5, see Figure 2. The cam 11 is shown as formed out of the metal of the base of platform 2, see Figure 3.

A bi-metallic bar 10 is used to give a thermostatic force to elevate platform 2 into an approximate position as is seen in Figure 2 from that shown in Figure 1 as and when a cooking utensil is placed on platform 2. The movement of the thermostatic bar 10 is shown in dotted lines 10a. Bar 10 is distorted by the heat radiating from the heater 1 through an opening 25 formed in the base of platform 2. Bar 10 is fastened at one end by rivets 21 which rigidly secure the control arm 11, the bi-metallic bar 10 and the support base 12 together. In the base of case 4 a recess 31 is formed to permit a pivot 13 to engage with the support base 12 and referring to Figure 5 the pairs of arrows 32 and 33 indicate the coordination of movement when index pointer 22 is manually displaced along the slot 24 in case 4 whereby the thermostatic bar 10 is likewise moved along the bottom of cam 11, see Figures 3 and 5. When the pointer 22 is thus moved in accordance with the indices 23, on the exterior of case 4, see Figure 1, the distortion necessary for bi-metallic bar 10 to contact the bottom of cam 11 from a normal cold position as is seen in Figure 2, after the energization of heater 1 is thereby varied in predetermined degree and is translated into the time-factor necessary for determining the desired cooking interval.

Furthermore on each operation of the device, considering a constant heating characteristic as is generated by heater 1 with its radiation through orifice 25, if the gravity load is increased due to an increase in content of the pot which the bi-metallic bar 10 has to lift after it contacts cam 11 in order to elevate arm 8 out of contact with member 7 of switch 6 in order to de-energize switch 6 a further differentiation of timing is interposed in the thermostatic equation as it will require a higher temperature-mean of bar 10 to do the work of lifting the increased load in question and hence a longer time interval for cooking. A conventional plug connector 16 is connected to cable 15 which in turn is connected to switch 6. Two lead wires 17 and 18, see Figure 5, form the electric circuit between the heater 1 through its terminals 26 and the switch 6.

Figure 4:
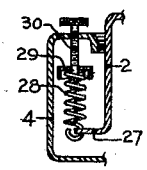
Figure 4 is a fragmentary view in elevation of a modification of the biasing spring for the pot supporting platform wherein means are provided to manually adjust the tension of the biasing spring.

In Figure 4 is shown a modification of the biasing spring structure as is seen in Figure 2. The modification consists of means to adjust as desired the biasing action of spring 5. In Figure 4 the equivalent of spring 5 is the spring 28, which is under compression in order to bias platform 2 through arm 27 connected thereto. By means of the knurled headed screw 30 which is threaded into case 4, the cupped spring-centering member 29 may be moved in or out, thereby varying the compression of spring 28 and varying the bias on pivoted platform 2. For initial calibration in the factory, this adjustability is desirable.

It is to be noted that all food has an approximate water content of over 90%; therefore the calibration of the several components that cooperate to time the brewing interval in this device wherein a liquid is being timed will also serve, except for the manual adjustment for the desired cooking time interval for many other foods. However, in all instances, the weight of the utensil or vessel used should be a constant.

The operation of the device is as follows:

Assuming the operator desires to make three cups of coffee and has placed the necessary coffee and water in pot 19, on placing pot 19 on the platform 2, Figure 1 represents the position of the components at this moment. The index 22 being positioned as shown on scale 23, the switch 6 is closed due to arm 8 depressing switch actuator 7. The heater 1 is now energized and heat starts to radiate through orifice 25 and strike the bi-metallic bar 10, which gradually deflects into a position represented by the phantom outline 10a. As and when bar 10 contacts the lower edge of cam element 11, which might be at a position approximating that shown in Figure 3, it may deflect slightly under the load of lifting the unbalanced increment of the combined weight of the pot 19 and the contents of same. When it has lifted platform 2 sufficiently so that arm 8 has permitted switch actuator 7 to place switch 6 in an "off" position, a time interval has elapsed sufficient to raise the water in pot 19 to percolating temperature and permit a predetermined interval of brewing in accordance with the position of index member 22, as has already been described. At this moment of the termination of the brewing interval, heater 1 has been de-energized and starts to cool; however, as bi-metallic bar 10 is in physical contact with cam 11, and heat is transmitted to it from the high temperature heat resident in the heater itself which is of relatively great mass, and bar 10 is also in its closest proximity to heater 1 at this moment, the cooling of bar 10 is relatively slow and prolongs the interval during which the switch 6 is in its "off" position. In this manner there is a slow "hunting" action of the bar 10 in its deflection, causing switch 6 to intermittently operate to keep heater 1 in action sufficiently to maintain a satisfactory beverage temperature in pot 19.

It is evident to those skilled in the art that the surface of contact between cam 11, which is at relatively high temperature, and bi-metallic bar 10 can be enlarged beyond the illustrative contact as is herewith shown, so that the heat transfer from cam 11 to bar 10 may be increased by this enlarged area of physical contact to maintain bar 10 in its extreme upward deflection for a considerable interval of time, and thus appreciably increase the "off" interval of the "hunting" cycle of the bi-metallic bar 10 during the stand-by heating period.

What I desire to protect by United States Letters Patent is encompassed in the following claims:

1. An automatic cooking device, comprising a case, a utensil sustaining platform, an electric heater incorporated within said platform, means to support said platform on a pivot secured to said case and positioned outside of the gravitational center of said platform, spring means connecting said case to said platform to normally bias said platform against its gravitational unbalance into an initial unloaded position, a thermal responsive element one end of which is fastened to a swiveled support on said case the axis of which is positioned at right angles to the axis of said platform supporting pivot, a depending cam secured to the bottom of said platform and in contacting relationship with the free end of said thermal responsive element when said element is moved within a predetermined arc on its swiveled axis, a switch controlling the energization of said heater and means to close said switch and energize said heater when said platform is depressed by the weight of a utensil placed thereon and means to radiate heat from said heater to said thermal responsive element in order to elevate said platform to its approximate initial position by the movement of said thermal responsive element against said depending cam to open said switch and de-energize said heater.

2. An automatic cooking device, comprising a case, a utensil sustaining platform, an electric heater incorporated within said platform, means to support said platform on a pivot secured to said case and positioned outside of the gravitational center of said platform, spring means connecting said case to said platform to normally bias said platform against its gravitational unbalance into an initial unloaded position, a thermal responsive element one end of which is fastened to a swiveled support on said case the axis of which is positioned at right angles to the axis of said platform supporting pivot, a depending cam secured to the bottom of said platform and in contacting relationship with the free end of said thermal responsive element when said element is moved within a predetermined arc on its swiveled axis, a switch controlling the energization of said heater and means to close said switch and energize said heater when said platform is depressed by the weight of a utensil placed thereon and means to radiate heat from said heater to said thermal responsive element in order to elevate said platform to its approximate initial position by the movement of said thermal responsive element against said depending cam to thereby open said switch and de-energize said heater and an index arm secured to said swiveled support to manually turn said thermal responsive element on its supporting axis to predetermine the point along the surface of said cam at which said heat responsive element will make contact therewith.

3. An automatic cooking device, comprising a case, a utensil sustaining platform, an electric heater incorporated within said platform, means to support said platform on a pivot secured to said case and positioned outside of the gravitational center of said platform, spring means connecting said case to said platform to normally bias said platform against its gravitational unbalance into an initial unloaded position, a thermal responsive element one end of which is fastened to a swiveled support on said case the axis of which is positioned at right angles to the axis of said platform supporting pivot, a depending cam secured to the bottom of said platform and in contacting relationship with the free end of said thermal responsive element when said element is moved within a predetermined arc on its swiveled axis, a switch controlling the energization of said heater and means to close said switch and energize said heater when said platform is depressed by the weight of a utensil placed thereon and means to radiate heat from said heater to said thermal responsive element in order to elevate said platform to its approximate initial position by the movement of said thermal responsive element against said depending cam to thereby open said switch and de-energize said heater and an index arm secured to said swiveled support to manually turn said thermal responsive element on its supporting axis to predetermine the point along the surface of said cam at which said heat responsive element will make contact therewith and indices on the outside of said case registering with the arc of movement of said index arm.

4. An automatic cooking device comprising a cooking vessel, a movable platform therefor, an electric heating element in said platform, a first counterbalanced support means to limit movement of said platform when said empty cooking vessel is emplaced on said platform, switch means responsive to the further movement of said platform relative to said first support, means for energizing said heating element, a second support means for said platform consisting of a thermally-responsive element positioned to respond to the temperature of a heating element and means for applying the force consequent to the heating of said thermally-responsive support element to overcome the weight of the contents of said cooking vessel in order to move said platform to its initial position and thereby de-energize said heating element.

5. An automatic cooking device comprising a cooking vessel, a movable platform therefor, an electric heating element in said platform, a first counterbalanced support means to limit movement of said platform when said empty cooking vessel is emplaced on said platform, switch means responsive to the further movement of said platform relative to said first support, means for energizing said heating element, a second support means for said platform consisting of a thermally-responsive element positioned to respond to the temperature of a heating element and means for applying the force consequent to the heating of said thermally-responsive support element to overcome the weight of the contents of said cooking vessel in order to move said platform to its initial position and thereby de-energize said heating element and manual means to control said means for applying the forces consequent to the heating of said thermally-responsive element in order to vary the interval intervening between the two movements of said platform in proportion to the weight of the contents of said cooking vessel.

6. An automatic cooking device, the combination comprising a cooking utensil, a displaceable supported platform therefor, an electric heating element co-ordinated with said platform to heat said utensil thereon, a switch for said heating element, a support element for said platform composed of a heat-responsive element, means to heat said heat-responsive element during the energization of said electric heating element and means responsive to the difference in the displacing force set up in said heat-responsive support element in consequence to its heating and the weight force of the food contents placed in said cooking utensil to displace said platform to its initial position in order to actuate said switch whereby to de-energize said electric heating element.

NATHANIEL B. WALES.

REFERENCES CITED

The following references are of record in the file of this patent:

UNITED STATES PATENTS

| Number | Name | Date |
|---|---|---|
| 1,816,994 | Armstrong | Aug. 4, 1931 |
| 2,140,479 | Myers et al. | Dec. 13, 1938 |
| 2,315,327 | Gomersall | Mar. 30, 1943 |
| 2,337,098 | Gomersall | Dec. 21, 1943 |
| 2,347,707 | Myers | May 2, 1944 |
| 2,422,580 | Meier | June 17, 1947 |
| 2,430,715 | Grayson | Nov. 11, 1947 |